June 21, 1938.    A. H. BRICKER    2,121,336
BIFOCAL EYEGLASS MOUNTING
Filed March 5, 1937
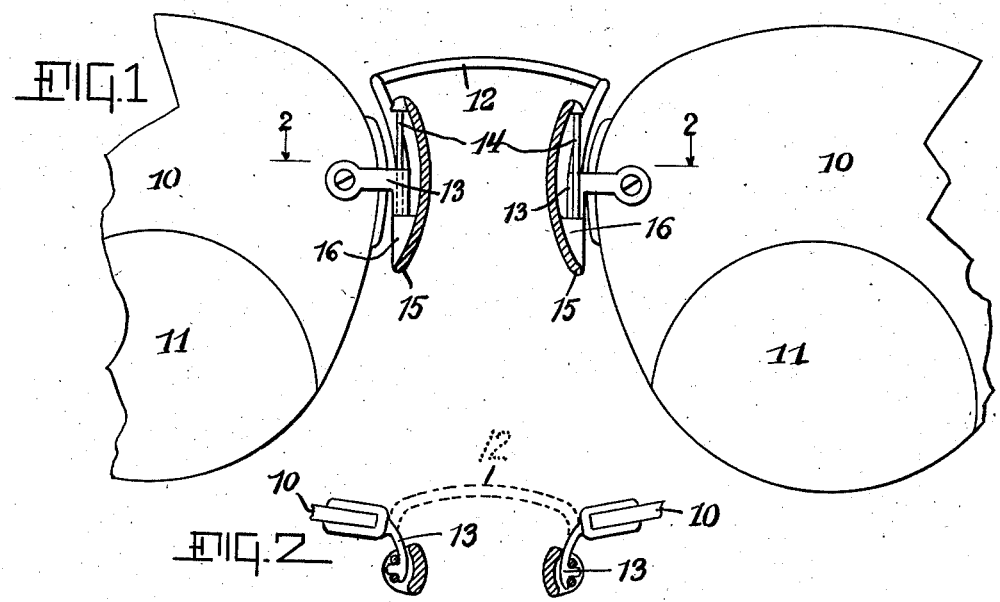
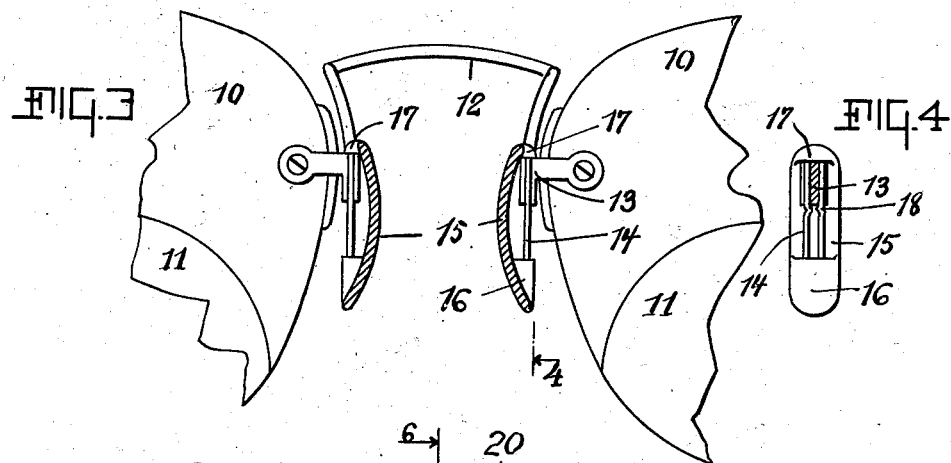
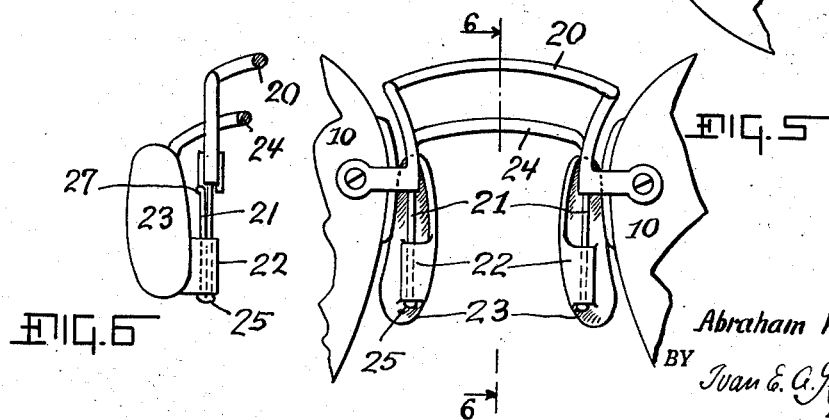
INVENTOR.
Abraham H. Bricker
BY Ivan E. A. Konigsberg
ATTORNEY Patented June 21, 1938

2,121,336

UNITED STATES PATENT OFFICE 2,121,336

BIFOCAL EYEGLASS MOUNTING

Abraham H. Bricker, Brooklyn, N. Y.

Application March 5, 1937, Serial No. 129,118

1 Claim. (Cl. 88—49)

The object of this invention is to provide an improved mounting for bifocal eye-glasses so arranged that the glasses may be raised and lowered for normal vision and for reading, normal vision herein meaning the use of the glasses for purposes other than reading. In the accompanying drawing:

Fig. 1 is a view of a pair of bifocal glasses equipped with a mounting according to this invention, with parts in section and parts broken away. The illustration is from the rear or face side of the glasses as distinguished from the front.

Fig. 2 is a plan view taken substantially on the line 2—2 of Fig. 1 with parts removed.

Fig. 3 is a view similar to Fig. 1 but shows the glasses raised for reading purposes.

Fig. 4 is a view taken substantially on the line 4—4 of Fig. 3.

Fig. 5 is a front view of a modified mounting with parts broken away and showing the glasses raised for reading purposes.

Fig. 6 is a view substantially on the line 6—6 of Fig. 5.

Referring first to Figs. 1-4 the glasses are marked 10 and the reading glass portions 11. The glasses are as usual secured to the bridge 12. The latter is provided with rearwardly extended guides 13, 13 which slide between and are guided upon vertically disposed springs or guide members 14, 14 which are secured to the nose pads 15, 15. The normal position of the glasses are as shown in Fig. 1 where it will be observed that the glass guides 13 are at the lower ends of the guide springs 14 and rest upon lugs 16 projecting from the nose pads. When it is desired to use the reading glasses 11, 11, the glasses are pushed upwardly into the position shown in Fig. 3. The glass guides then slide upwards against lugs 17 extending from the nose pads. They are held in their upper position by small projections or humps 18 on the springs as shown in Fig. 4. The springs are so spaced that the glass guides may slide easily upon them and the springs give sufficiently to permit the glass guides to pass the humps 18. In pushing the glasses up or down the grip of the nose pads upon the nose and their seating in the corner of the eye and nose of the wearer is sufficient to offer the necessary resistance against the movement of the glasses to enable the guide members to pass the humps on the springs. These latter are yieldable in a plane substantially parallel to the plane of the nose pads.

Figs. 5—6 illustrate a modification in which the glasses connecting bridge 20 carries springs 21 which slide in sockets 22 secured to the nose pads 23 which latter are also connected by a second bridge 24. As seen in Figs. 5 and 6 the reading glasses have been moved up into reading position where they are held by the expanding springs 21 in the sockets 22. The springs have stops 25 at their bottoms which take against the sockets to position the glasses. When it is desired to use the normal glasses 10 the upper bridge with the glasses is pushed down. The springs are then compressed within the sockets and have upper stops 27 to position the glasses for normal use.

The device provides a mounting whereby persons using bifocal glasses may conveniently adjust the glasses for normal or for reading use. The movement of the glasses is perhaps not more than one quarter of an inch and for this purpose the bifocals will be made that much deeper or lower down.

No attempt has been made in the drawing to correctly illustrate the position, size and location of the glasses or the mounting other than to illustrate the invention.

I claim:—

A mounting for bifocal eyeglasses including a pair of nose pads for positioning the glasses for use other than reading, an upper and a lower stop secured to the upper and lower edges of the nose pads respectively, parallel spring members secured to the nose pads and extending between said upper and lower stops thereon, a bridge member for joining the glasses, rearwardly extending guides on said bridge member in frictional engagement with the said parallel spring members and bends in the latter for maintaining the said guides and bridge member in a predetermined upper or lower position between the said bends and within the upper or lower stop with respect to the said nose pads.

ABRAHAM H. BRICKER.